L. A. WATSON.
SYSTEM OF ELECTRICAL DISTRIBUTION.
APPLICATION FILED SEPT. 19, 1919.
1,389,333.
Patented Aug. 30, 1921.
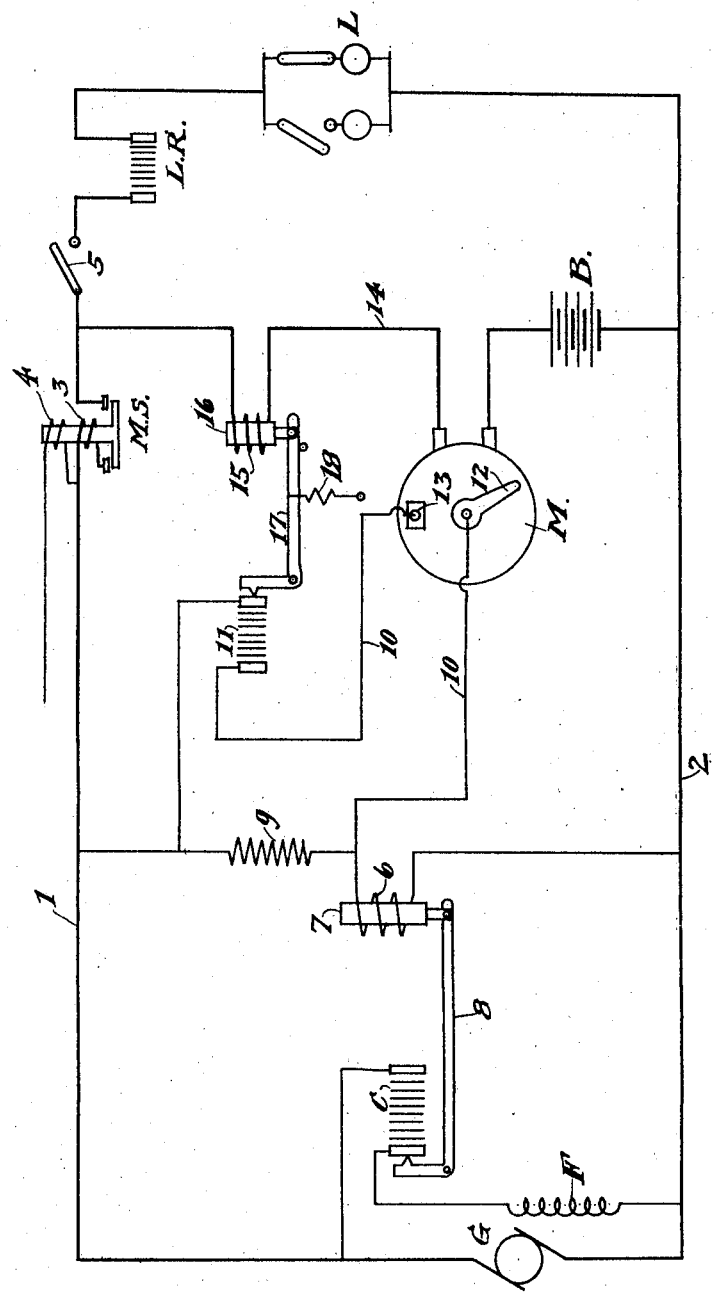

UNITED STATES PATENT OFFICE.

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,333. Specification of Letters Patent. Patented Aug. 30, 1921.

Application filed September 19, 1919. Serial No. 325,008.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and more particularly to an improved car lighting system wherein a variable speed generator is employed to charge a storage battery and lamps are associated for connection to be charged by the generator or by the battery.

It is the primary object of the invention to provide simple and efficient means, including an ampere hour meter indicative of the state of battery charge by current measurement to effectually terminate the charging current after a predetermined battery input.

Other objects and advantages will be in part noted hereinafter in connection with the following description of the accompanying drawing, which illustrates an exemplary embodiment of the invention and wherein are represented schematic parts of the system and a wiring diagram of the connections.

Referring generally to the drawings, there is represented an axle-driven variable speed generator G having a shunt field winding F, which latter includes a variable regulating resistance, such as a carbon pile C. The generator is adapted for connection by mains 1 and 2 to charge a storage battery B and supply lamps L. An automatic main switch MS of well-known construction is present to control continuity of line 1 by the action of a series coil 3 and a shunt coil 4 designed to close the circuit when and while the voltage of the generator exceeds a predetermined value and to disconnect the generator when its voltage is below a predetermined value. A manual switch 5 may be provided in the lamp circuit and a lamp regulator including a variable resistance LR is utilized to limit the voltage applied to the lamps when the latter receive current from the generator or from the battery.

The generator is regulated by electro-responsive means to compensate for speed changes and otherwise to meet the requirements of the system, as will be described. As shown, the regulating apparatus includes a voltage coil 6 connected across the mains 1 and 2 and tending when effective to position a core 7 connected to bell crank lever 8 for varying the degree of compression of the carbon pile C and the strength of the shunt field winding F to maintain relative constancy of generator voltage as against speed changes and as against gradual changes in the state of generator charge. An element of resistance 9 is positioned in series with the coil 6 and controlled at the end of charging by a shunt circuit 10 thereabout, including a smaller variable resistance, such as a carbon pile 11. Shunt 10 has a break to be closed at the end of a predetermined ampere hour charge of the battery by a movable contact 12 and a fixed contact 13 of an ampere hour meter M connected in series in the battery branch 14. The value of resistance 11 is in turn controlled by a series coil 15 also connected in the battery branch 14 and acting on a core 16 attached to bell crank lever 17 which works against the carbon pile resistance 11. Lever 17 is counterbalanced by a spring 18.

The operation of the system as described may be briefly explained as follows: During the period of battery charging prior to completion of charge, shunt 10 about resistance 9 is broken across the meter contacts 12 and 13, so that the generator voltage is maintained at a relatively high level. At the end of charging, however, the shunt 10 is completed to weaken the effect of resistance 9 and coil 15, which responds to battery charging current, then acts to compress carbon pile 11 to so weaken the effect of resistance 9 as to insure a value of generator voltage constancy by regulating coil 6 sufficiently reduced to substantially terminate charging current. That is to say, for example, coil 15 will be balanced at a position wherein the generator regulator holds the voltage to a value which reduces the current in coil 15 to a substantially negligible amount, as far as battery over-charging is concerned. Lever 17 will also preferably be provided with a dash pot or other dampening device to prevent vibration or excessive fluctuation in its movement.

It is to be understood that the invention as described is susceptible of modification and embodiment in systems utilizing regulators of other character, and that such modifications and combinations can be effected without sacrifice of certain of the attendant advantages hereof and without departure from the scope of the appended claims.

Having described my invention, what I claim as new and desire to secure by Letters Patent, is:—

1. In combination, a variable speed generator, a battery adapted for connection to be charged thereby, a regulator including a voltage coil tending when effective to maintain substantial constancy of generator voltage as against speed changes and as against gradual changes in the counter E. M. F. of the battery, a meter indicative of the state of battery charge by current measurement and adapted, after substantial battery charging, to affect said regulator for reducing the value of generator voltage constancy to be thereafter maintained, and means including a current coil connected in the battery branch to affect said regulator after the action of said meter.

2. In combination, a variable speed generator, a battery adapted for connection to be charged thereby; a regulator for said generator including a voltage coil tending when effective to maintain substantial constancy of generator voltage as against speed changes and as against changes in the counter E. M. F. of said battery; a resistance in the circuit of said coil; means, including an ampere hour meter indicative of the state of battery charge and including a variable resistance, to shunt said first-mentioned resistance; and means including a current coil connected in the battery branch to control said variable resistance after the shunting of said first-mentioned resistance.

3. In combination, a variable speed generator having a shunt field winding, a battery adapted for connection to be charged thereby, a regulator including a voltage coil tending when effective to maintain substantial constancy of generator voltage as against speed changes, means including an ampere hour meter to establish a shunt about said resistance after a predetermined ampere hour charge to said battery, and means including a current coil connected in the battery branch to vary the effect of said shunt for insuring substantial termination of charging current to said battery.

In testimony whereof I affix my signature, in the presence of two witnesses.

LEONARD A. WATSON.

Witnesses:
HELEN M. SEAMANS,
DAVID A. WOODCOCK.